United States Patent [19]

Andrieu et al.

[11] 4,039,377

[45] Aug. 2, 1977

[54] NUCLEAR BOILER

[75] Inventors: Jean-Louis Andrieu, Paris; Yves Bonnet, Versailles; Michel Viaud, Gif-sur-Yvette, all of France

[73] Assignee: Commissariat a l'Energie Atomique, Paris, France

[21] Appl. No.: 559,542

[22] Filed: Mar. 18, 1975

[30] Foreign Application Priority Data

Mar. 20, 1974 France .................. 74.09517
Aug. 22, 1974 France .................. 74.28862

[51] Int. Cl.² ............................................. G21C 19/28
[52] U.S. Cl. ........................ 176/65; 176/60; 165/107; 165/158; 60/644; 122/32
[58] Field of Search ................. 176/60, 61, 65; 165/107, 158, 155; 122/32; 60/644

[56] References Cited

U.S. PATENT DOCUMENTS

| 3,194,744 | 7/1965 | Ainley et al. | 176/60 |
| 3,210,254 | 10/1965 | Fortescue | 176/60 |
| 3,360,037 | 12/1967 | Ammon | 165/158 |
| 3,394,051 | 7/1968 | Purdy | 176/65 X |
| 3,490,521 | 1/1970 | Byerley | 165/158 |
| 3,498,880 | 3/1970 | Gollion | 165/107 X |
| 3,793,143 | 2/1974 | Müller | 176/65 |
| 3,793,701 | 2/1974 | Chartet | 165/158 X |
| 3,798,909 | 3/1974 | Oakes | 165/155 |
| 3,802,994 | 4/1974 | Förster et al. | 176/65 X |
| 3,916,841 | 11/1975 | Schröder et al. | 122/32 |

FOREIGN PATENT DOCUMENTS

| 1,435,453 | 5/1965 | France | |
| 1,535,507 | 5/1967 | France | |
| 1,095,409 | 12/1960 | Germany | 176/61 |
| 1,148,664 | 7/1961 | Germany | 176/60 |

Primary Examiner—Peter A. Nelson
Attorney, Agent, or Firm—Lane, Aitken, Dunner & Ziems

[57] ABSTRACT

In a pressurized-water reactor (PWR), the top flange of the pressure vessel is penetrated by nozzles connected to vertical primary heat-exchangers which are located outside the vessel and above the level of connection. The heat exchangers and the primary circulating pumps are so arranged as to leave a free and unobstructed area above the reactor closure head, thus facilitating refuelling operations as well as remedial work on both pumps and heat exchangers in the event of a fault condition.

7 Claims, 6 Drawing Figures

NUCLEAR BOILER

This invention relates to a nuclear boiler.

In more exact terms, the present invention is concerned with a nuclear boiler of the pressurized-water type and of medium or low power which can be employed either for the production of thermal or electric power or for nuclear ship propulsion.

In even more exact terms, the invention relates to improvements in pressurized-water reactors with specific reference to the primary loop systems for the circulation of coolant in reactors of this type.

The different types of nuclear reactor which are known at the present time fall into two main classes in regard to the structure and arrangement of the primary loops for the circulation of coolant.

Firstly, there are the so-called integrated reactors in which the primary pumps and primary heat exchangers are placed within the interior of the reactor vessel.

In a reactor of this type, all the liquid which is liable to be contaminated is therefore confined within the interior of the reactor vessel itself and the primary circuits are reduced to a minimum or may not even be provided.

There is an attendant disadvantage in the fact that the volume of the reactor vessel is thus considerably increased, with the result that the volume of coolant fluid is very substantial. From this it follows that the containment structure which is designed to withstand the pressure in the event of pipe failure must be of very large bulk or be endowed with very high strength or in other words must be of very substantial weight, which would clearly be particularly objectionable in the case of a nuclear boiler which is installed in a ship.

The second type of reactor concerns the reactors of conventional design such as pressurized-water reactors, for example. In these reactors, provision is made for cooling loops constituted by primary pipes located outside the reactor vessel and having an appreciable length, in which each loop essentially comprises a pump and a steam generator.

The installation is therefore of substantial overall size and a liquid which is liable to be contaminated is circulated within a primary piping system which is much more extensive, thus resulting in a reduction in safety standards.

Between these two main types, there is another class of reactor in which the steam generators or primary heat exchangers are disposed in an annular ring located within the interior of the pressure vessel, whilst the pumps are located outside said vessel.

In this case, a major drawback lies in the difficulty involved in carrying out remedial action on the heat exchangers in the event of damage sustained by these latter. In addition, these integrated heat exchangers necessarily increase the volume of the pressure vessel.

The precise aim of the present invention is to provide a nuclear boiler of the pressurized-water type which overcomes the disadvantages mentioned above by avoiding any increase in volume of the reactor vessel while minimizing the overall size of the installation and reducing the lengths of the primary pipes to minimum values. In addition, the nuclear boiler in accordance with the invention permits easy reactor core refuelling operations. Said boiler also permits circulation of the coolant liquid by natural convection in the event of stoppage of the primary pumps.

The nuclear boiler in accordance with the invention comprises a vertical pressure vessel provided at the top with a closure head, nozzles having their openings in said vessel and at least equal in number to the heat exchanger or exchangers, said nozzles being formed in a top pressure-vessel flange which forms a junction and supporting surface at the level of each nozzle, the substantially vertical heat exchangers being located outside said pressure vessel and a liquid for cooling the reactor core being circulated through each heat exchanger, said heat exchanger or exchangers being connected to said junction surfaces, said heat exchangers being entirely located above the junction level and also located externally of the space which forms an extension of said pressure vessel above said closure head; said pump or pumps are also located outside said pressure vessel so as to ensure that none of said pumps is located within the interior of the space which forms an extension of said pressure vessel above said closure head.

In a first embodiment, the boiler comprises a number of pumps corresponding to the number of heat exchangers, the lower end of each exchanger is fixed on a water-box so as to constitute the inlet and outlet of one heat exchanger, said water-box being connected to said pressure vessel by means of a duct fixed on said junction surface at the level of a nozzle opening, said duct and said nozzle being fitted with an axial pipe such that one pipe extremity has its opening in an orifice formed in a barrel which surrounds the reactor core and the second pipe extremity opens into said water-box. In addition, said water-box is provided with internal baffle-plates for connecting the second pipe extremity to the heat-exchanger inlet, for connecting the outlet of said heat exchanger to the inlet of said pump and for connecting the outlet of said pump to said pipe extremity which is connected to said water-box.

It is preferably ensured in this case that the pump associated with a heat exchanger is also vertical and attached to the lower portion of said water-box, said pump being located substantially in the line of extension of said heat exchanger.

It is also preferably ensured that each water-box is provided internally with a first open-topped shell of revolution placed coaxially with the pump and forming an extension of an opening provided at the bottom of said water-box in order to permit the introduction of the pump rotor, a second open-topped shell completely surrounding the first shell in coaxial relation thereto, and a third shell displaced off-center with respect to the first two shells and closed at the top by a domical portion, said third shell being partially joined to said second shell by means of its domical portion so that the free bottom edge thereof forms with the second shell a passageway between the interior of the second shell and the remainder of said water-box.

In an alternative embodiment, said vessel flange is provided with a number of nozzles corresponding to the number of pumps and heat exchangers; said heat exchangers are fixed on the junction surface at the level of a certain number of nozzle openings whilst the pumps are fixed on said surface at the level of the other openings. Said pumps are substantially vertical and located entirely above their level of connection to the pressure vessel.

In a first mode of execution of said alternative embodiment, the lower end of each heat exchanger is fixed on a water-box so as to constitute the inlet and outlet of said exchanger, said water-box being joined to a barrel which surrounds the reactor core by means of a duct fixed on said junction surface at the level of a nozzle opening and being extended within the interior of the reactor vessel by a sleeve providing a connection with said barrel, said duct and said sleeve being fitted with an axial pipe such that one pipe extremity has its opening in an inner shell located inside said barrel and the second pipe extremity opens into the water-box, said water-box being fitted with baffle-plates for connecting said second pipe extremity to the inlet of said heat exchanger. The lower portion of each pump is fixed on a water-box so as to constitute both the inlet and the outlet of said pump. The water-box is connected to the pressure vessel by means of a duct fixed on said junction surface at the level of a nozzle opening. Said duct and said nozzle are fitted with an axial pipe such that one pipe extremity has its opening in an orifice formed in a barrel which surrounds the reactor core and the second pipe extremity opens into said water-box.

In a second mode of execution of said alternative embodiment, said pressure-vessel flange has a sufficient thickness to provide within said flange a water-box which forms an extension of each nozzle and each junction surface surrounds each water-box. The pressure vessel is provided internally with a cylindrical shell which surrounds the reactor core and forms between said shell and said vessel an annular space into which said nozzles open. The lower portion constituting the inlet and outlet of each heat exchanger is fixed on a duct connected to a junction surface at the level of a water-box, said duct and said water-box being traversed axially by a pipe such that one pipe extremity is connected to the inlet of said heat exchanger and the other pipe extremity is connected to the core barrel at the level of a nozzle opening formed in said barrel and said pipe closes-off the opening which is associated with said water-box. The lower portion constituting the inlet and outlet of each pump is fixed on a duct connected to a junction surface at the level of a water-box. A water-box associated with a heat exchanger is connected to a water-box associated with a pump by means of a passageway formed in the thickness of the vessel flange, the inlet of a pump being connected to one of said passageways by means of a pipe extending axially through said duct which is associated with said pump.

A clearer understanding of the invention will be obtained from the following description which relates to a number of embodiments of the nuclear boiler in accordance with the invention, reference being made to the accompanying drawings, wherein.

Figure 5:
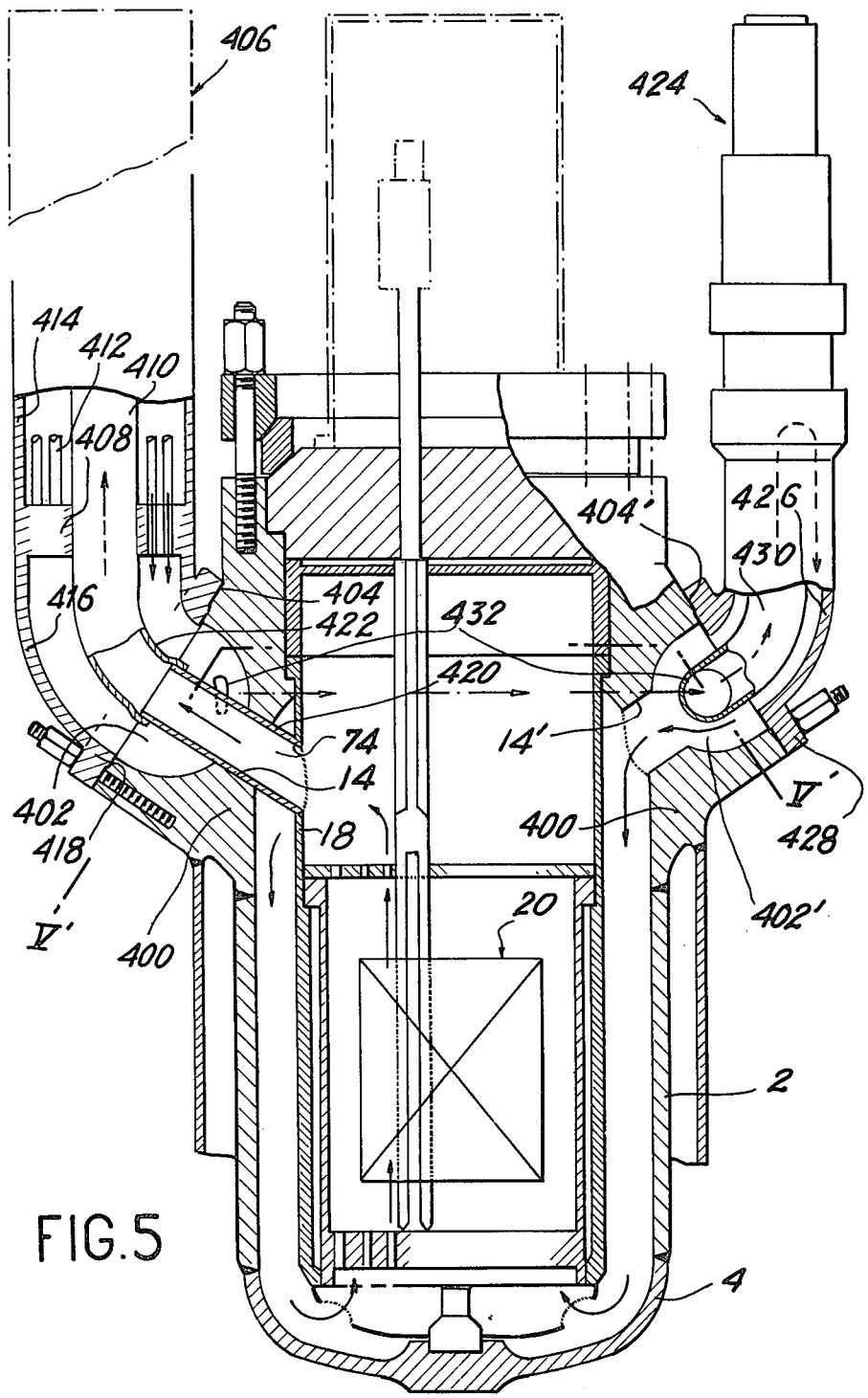
Figure 5:
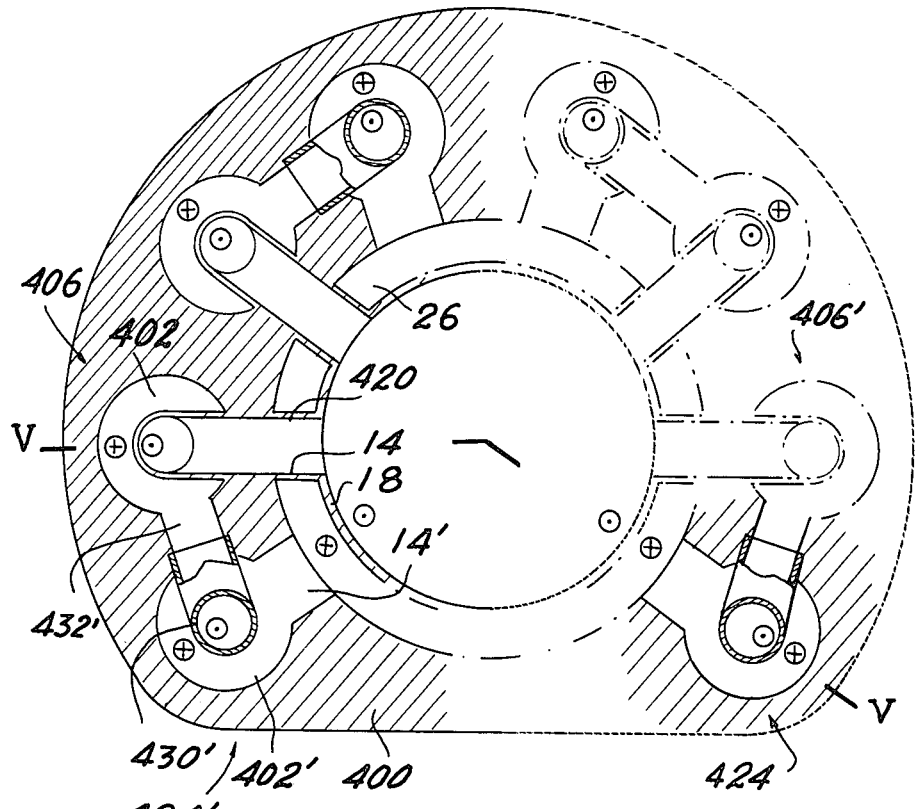

FIGS. 5 and 5' are views respectively in vertical cross-section and in horizontal cross-section taken along the plane V—V of FIG. 5 and showing an alternative form of construction in which the vessel flange is massive.

Figure 1:
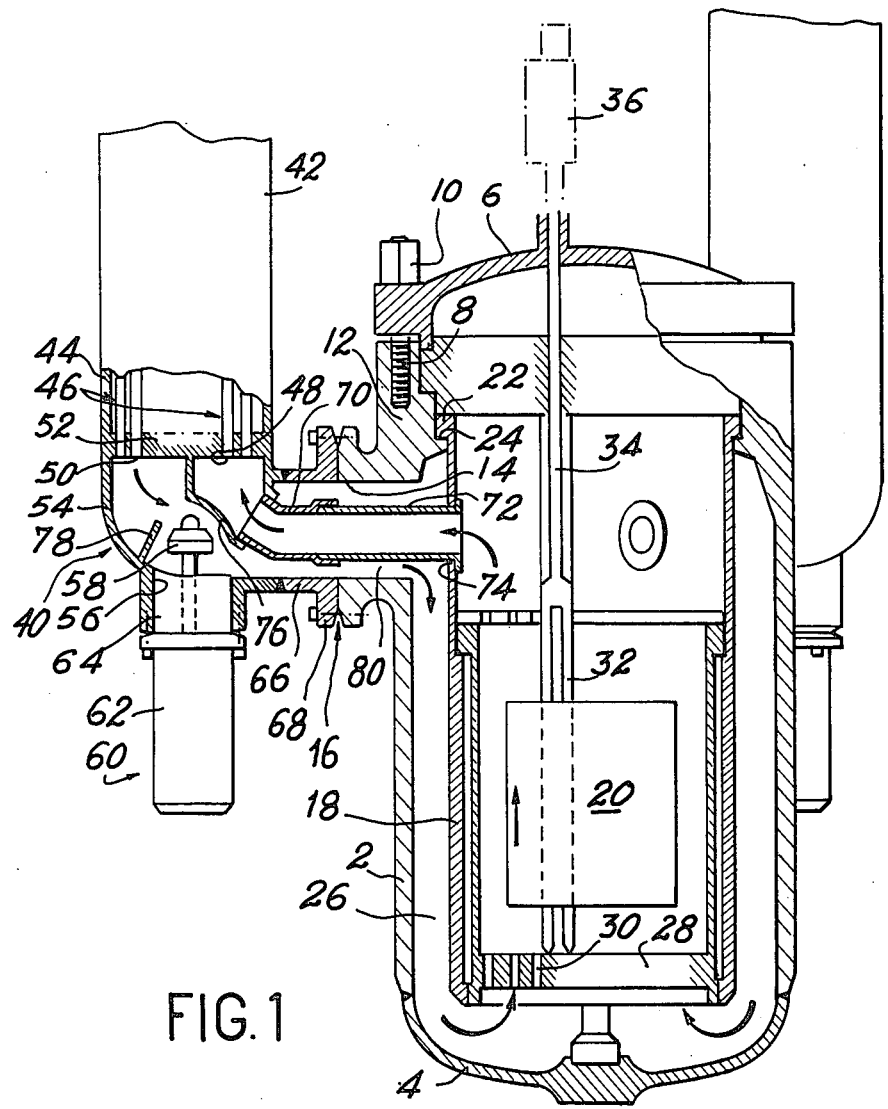
FIG. 1 is a vertical sectional view of a first embodiment of the invention.

A first embodiment of the nuclear boiler in accordance with the invention is shown in vertical cross-section in FIG. 1.

Said boiler comprises in known manner a vertical cylindrical pressure vessel 2 which is closed at the lower end by a bottom section 4 and at the upper end by a closure head 6 which is secured to the vessel 2 by means of studs 8 and nuts 10. Provision is made at the top portion of the vessel 2 for a massive flange 12 penetrated by nozzles having openings such as 14 and providing access to the interior of the vessel. At the level of each nozzle opening 14, the flange forms a surface 16 for connecting and supporting the steam generators and pumps as will be explained hereinafter. As shown in FIG. 1, said surface 16 can be formed by a sleeve-shaped component. Within the interior of the pressure vessel 2, the reactor core 20 which is represented diagrammatically is surrounded by a cylindrical barrel 18. Said core barrel is applied against the reactor vessel by means of a top flange 22 which cooperates with a support ledge 24 formed in the internal face of the reactor vessel. The core barrel 18 thus forms an annular space 26 between itself and the reactor vessel.

The core barrel 18 is provided with a bottom support casting 28 pierced by apertures 30 through which the coolant liquid is permitted to pass towards the reactor core 20. The fuel assemblies constituting the core rest on said bottom support casting 28. There is also shown diagrammatically a control rod 32 together with its drive shaft 34 and drive components 36. The drive shaft passes through the closure head 6.

The primary cooling circuit of the boiler will now be described. As is already known, this circuit serves to initiate circulation of the reactor core coolant and to extract the heat contained in the coolant by means of one or a number of heat exchangers through which is circulated a secondary liquid, said heat being derived from the energy released by the fuel. In this form of construction, a pump is associated with each heat exchanger. The reactor comprises a plurality of pump-exchanger assemblies which are all identical. The number of these assemblies is essentially dependent on the reactor power. Only one pump-exchanger assembly which is generally designated by the reference 40 will therefore be described below.

The heat exchanger 42 or steam generator is of the U-tube type. Thus a plurality of U-tubes designated by the reference 46 are provided within the heat-exchanger shell 44 and are fixed respectively at their inlets 48 and at their outlets 50 in a tube-plate 52 which is made integral with the shell 44 and forms the base of this latter. It can accordingly be stated that the portion of the tube-plate 52 corresponding to the inlets 48 constitutes the heat-exchanger inlet and that the portion of the tube-plate corresponding to the outlets 50 constitutes the heat-exchanger outlet. A water-box 54 is welded to the lower end of the heat exchanger and is therefore "closed" at the upper end by the tube-plate 52. The bottom of the water-box is penetrated by an orifice 56 for the introduction of the rotor 58 of the pump 60, the pump body 62 being fixed on a sleeve 64 which forms an extension of the orifice 56.

The water-box is connected to a short sleeve 66 of substantial thickness provided at the free extremity with a flange 68 which is fixed on the junction surface 16. There is thus formed a passageway between the reactor vessel 2 and the water-box 54. The duct formed by the nozzle opening 14 and the sleeve 66 is fitted with an axial pipe constituted by the tube sections 70 and 72 which are fitted one inside the other at the level of the junction face. The free extremity of the tube 72 is fixed in an orifice 74 formed in the core barrel 18. The free extremity of the tube 70 is rigidly fixed to a baffle-plate 76 located within the water-box which separates the liquid admitted into the steam generator 42 from the liquid discharged from this latter. Said liquid penetrates into the space limited by the shell 78 which defines the volute of the pump in conjunction with the baffle-plate 76.

As can be seen from FIG. 1, the steam generators have a vertical or substantially vertical axis. The generators completely free the space located above the closure head 6, with the result that refuelling operations are considerably simplified. Moreover, the steam generators are located above their level of connection to the reactor vessel and above the reactor core which constitutes the hottest point of the circuit. This makes it possible to have a circulation of primary liquid by natural convection even in the event of failure of the pumps.

Circulation of the primary liquid is carried out as follows: after discharge from the reactor core, said liquid penetrates into the tubes 72 and 70, passes along the U-tubes 44 and penetrates into the water-box 54. The liquid passes into the pump 60 and returns towards the reactor vessel through the annular space 80 formed between on the one hand the tubes 70 and 72 and on the other hand the sleeve 66 and the nozzle opening 14. The liquid then circulates downwards into the annular space 26 and is then re-injected into the lower end of the reactor core 20.

This mode of circulation of the primary liquid offers two types of advantages. In the first place, it is the cold liquid (discharged from the steam generator) and not the hot liquid which is in contact with the external walls (reactor vessel 2, sleeves 66), which is clearly favorable from the point of view of heat losses.

In the second place, the thermal stresses within these components (vessel 2, sleeves 66) are reduced by reason of the fact that they are in contact with the cold liquid. In point of fact, these components are of substantial thickness as has already been noted.

Figure 2:
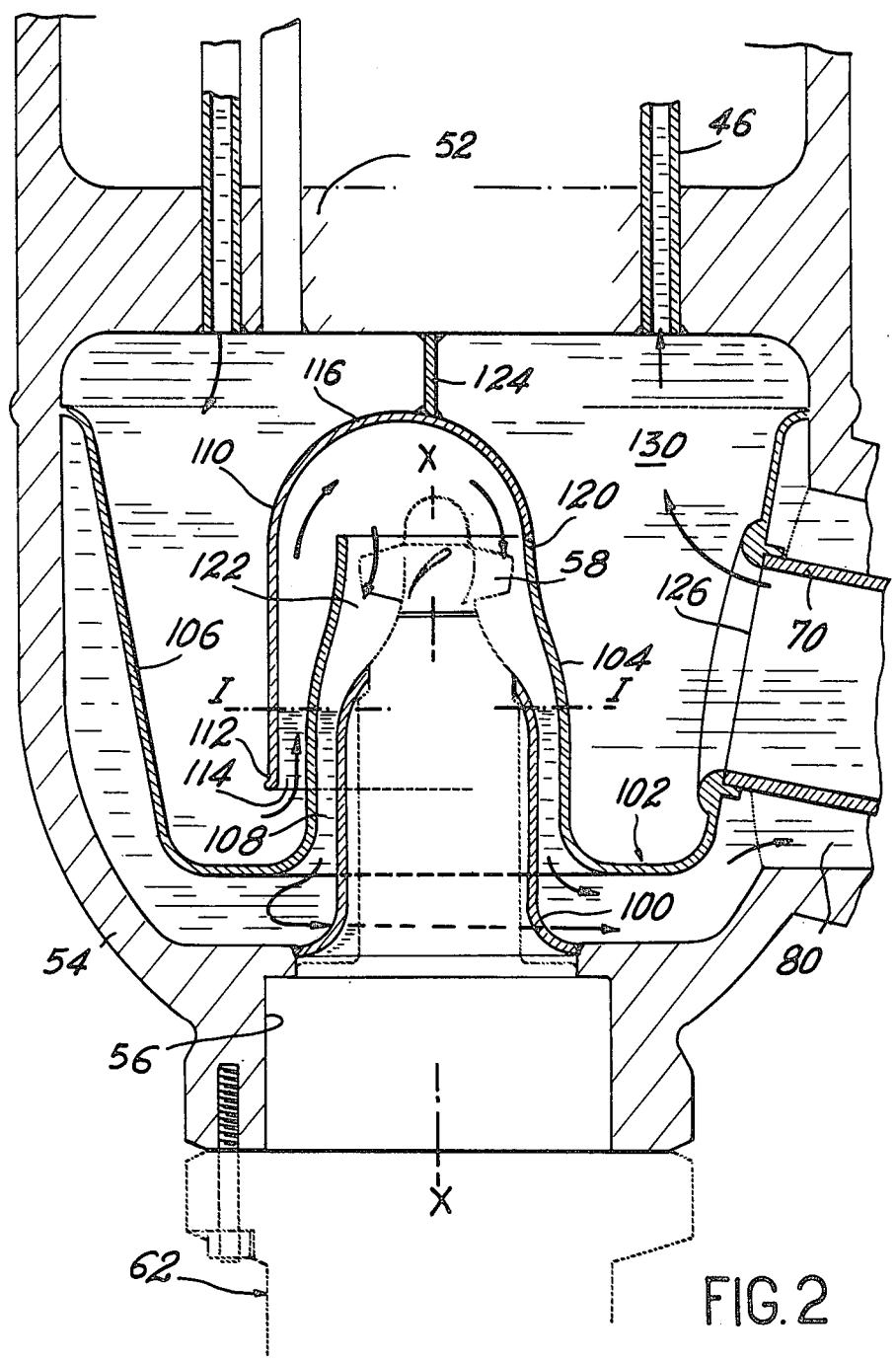
FIG. 2 is a preferred form of construction of the water-boxes of the boiler which is shown in FIG. 1.

FIG. 2 shows an alternative form of construction of the water-box 54 in which the sleeve orifice 56 is extended within the interior of the water-box by a shell 100 which has the same axis X—X as the pump rotor 58 and which decreases in diameter in the upward direction.

A second shell 102 which is concentric with the shell 100 is also shown and comprises a portion 104 which surrounds the shell 100 and a portion 106 forming a connecting skirt between the portion 104 and the top portion of the water-box.

An annular passageway 108 is provided between these two shells. A third shell 110 having the shape of an inverted bell is displaced off-center with respect to the shell 104. Part of the base of the shell 110 has a free edge 112 which forms a passageway 114. The domical top portion 116 of said shell is joined to the top edge 120 of the shell 104 along part of this latter in order to provide a communication between the passageway 114 and the interior 122 of the shell 104. Finally, a vertical partition-wall 124 divides into two sections that portion of the water-box which is located outside the shells 102 and 110. The skirt 106 is provided with an orifice 126 to which the free end of the tube 70 is connected in leak-tight manner.

The circulation of the primary liquid is represented by arrows and can readily be understood. The liquid penetrates through the tube 70 into the right-hand portion 130 of the water-box, circulates within the tubes 46 and is then discharged from the heat-exchanger in the left-hand portion 132 of the water-box.

The liquid then penetrates into the shell 110 through the passageway 114, passes through the blades of the pump rotor and returns through the annular space 80 towards the reactor vessel.

This particular arrangement makes it possible to remove the pump without any appreciable loss of liquid in the cooling circuit and in particular in the steam generator.

It can in fact be readily seen from FIG. 1 that, if the pump 60 is removed, there is formed at the bottom of the water-box an open hole which is constituted by the sleeve orifice 56. The liquid contained in the steam generators and in the top portion of the reactor vessel will consequently be discharged through said hole. This gives rise to a number of disadvantages including in particular the need to store the entire quantity of this water which has been in contact with the fuel assemblies.

By virtue of the structure which is illustrated in FIG. 2, this disadvantage no longer arises. In fact, after removal of the pump, the liquid stabilizes at the level represented by a chain-dotted line and designated by the reference I. At this level, the column of water contained in the steam generator is in fact balanced by the atmospheric pressure which prevails in the top portion of the shell 110. In consequence, it will clearly be necessary to drain-off only a very small volume of liquid before removing the pump.

Figure 3:
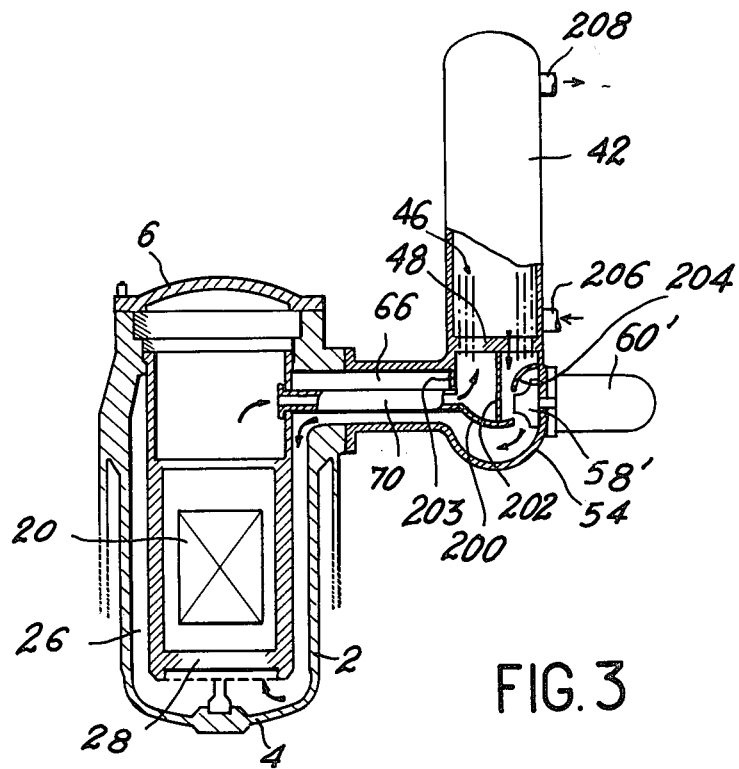
FIG. 3 is a vertical sectional view of an alternative form of construction in which the pumps are horizontal.

There is shown in FIG. 3 an alternative form of construction in which only the position of the pumps differs with respect to the form of construction shown in FIG. 1. Instead of being vertical and opening into the bottom of the water-box 54, the pump 60' is horizontal and its rotor 58' therefore opens on one side of the water-box. This displacement of the pump entails the need for modifications in the baffle-plates and shells provided within said water-box.

The free extremity of the tube 70 is connected to a baffle-plate 200 which is associated with the vertical partition-wall 202 and with the partition-wall 203 and connects the outlet of the tube 70 to the inlets 48 of the U-tubes 46. A water-box is provided with another baffle-plate 204 which defines the volute of the pump 60'.

The circuit provided for the flow of liquid within the water-box is indicated by arrows and can readily be understood without any further explanations, the "hot" liquid being admitted through the tube 70.

There are shown in this figure the pipes 206 and 208 respectively for admission and discharge of the secondary liquid into and from the steam generator enclosure.

Figure 4:
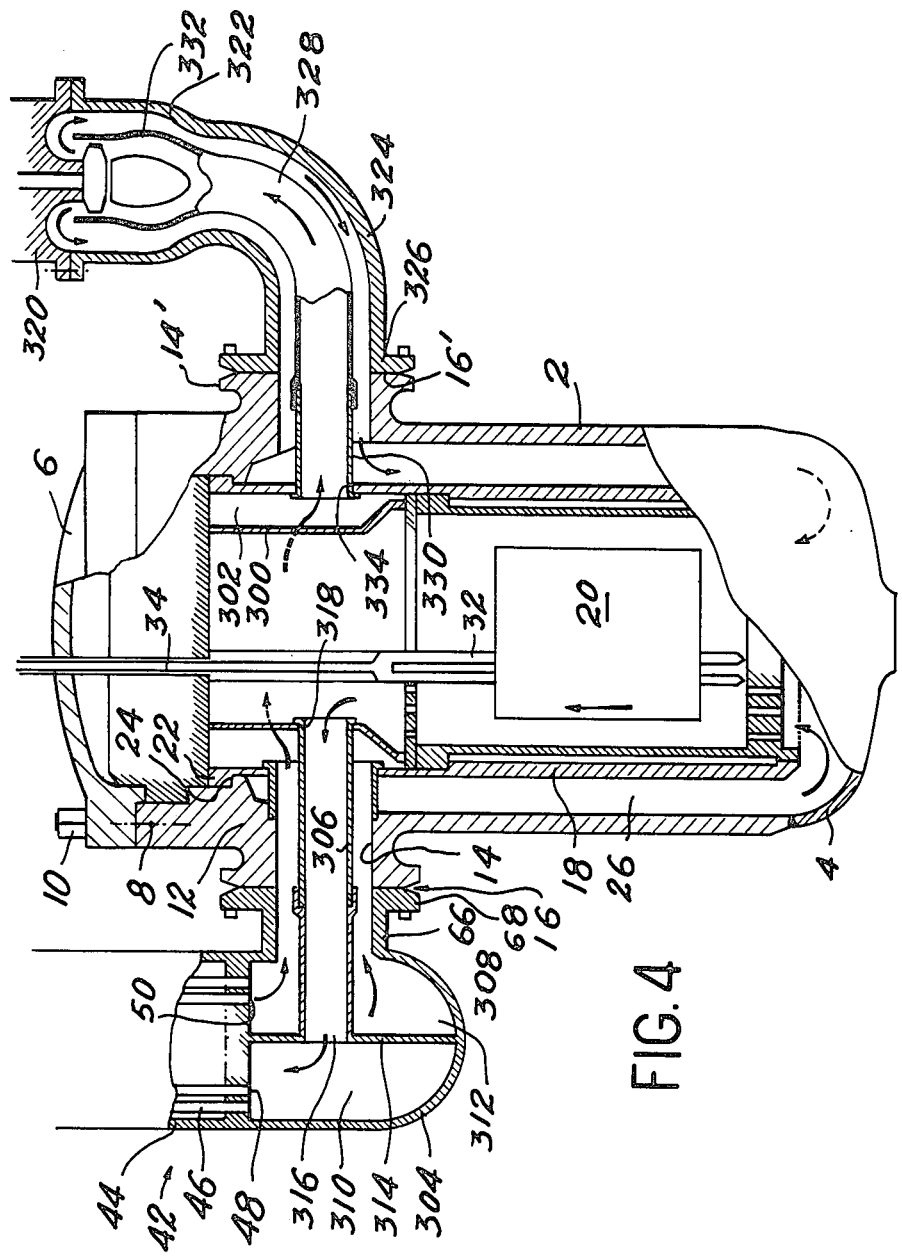
FIG. 4 is a vertical sectional view of a second alternative form of construction in which the pumps are connected directly to the pressure vessel.

There is shown in FIG. 4 another form of construction of the boiler in accordance with the invention. The same references have been employed to designate the parts which are common to those of FIG. 1; in order to gain a better understanding of these latter, further reference need only be made to the relevant passages of the description.

In this form of construction, the essential difference lies in the fact that the pumps and heat exchangers are separated, each pump and each heat exchanger being connected directly to the reactor vessel.

Consideration being given to the interior of the reactor vessel 2, the difference lies in the presence of an inner shell 300 which delimits above the reactor core 20 and inside the core barrel 18 an annular space 302 which, as will be explained hereinafter, serves to connect the heat-exchanger outlets to the pump inlets.

The heat exchanger 42 which again has a vertical axis and U-tubes 46 is fixed on a water-box 304. Said heat exchanger is welded to a sleeve 66 which forms a duct. The sleeve 66 is provided with a flange 68 for fixing on the junction surface 16 at the level of the nozzle opening 14. The opening 14 is traversed axially by a pipe constituted by the tubes 306 and 308 which are joined together at the level of the junction surface 16. The water-box is divided into two regions 310 and 312 corresponding to the inlets 48 and to the outlets 50 of the tubes by means of a vertical partition-wall 314. The free extremity of the tube 308 is joined to the orifice 316 formed in the partition-wall 314 and the free extremity of the tube 306 is joined to the orifice 318 formed in the inner shell 300. It is readily apparent that the "hot" liquid penetrates through the tubes 306 and 308 and that the "cold" liquid is discharged through the annular space surrounding the tubes 306 and 308 and arrives in the annular space 302 formed by the shell 300.

The skirt 322 of the pump 320 has an extension in the form of an elbowed duct 234 of substantial thickness provided with a flange 326 which is fixed on the junction face 16' opposite to the nozzle opening 14'. The duct 324 is traversed axially by a pipe constituted by the tubes 328 and 330 which are joined together at the level of the junction face 16'. The tube 328 is connected to the volute 332 which constitutes the pump inlet whilst the tube 330 is connected to the core barrel 18 at the level of the orifice 334. The "cold" liquid which is present in the annular space 302 arrives at the pump via the tubes 328 and 330 and is returned into the reactor vessel via the duct 324.

It should be noted that this form of construction offers all the advantages of the embodiment shown in FIGS. 1 and 3, namely the possibility of natural convection in the case of the coolant liquid by virtue of the positions of the steam generators with respect to the reactor core. The "hot" liquid always circulates within the central pipes whereas the "cold" liquid is in contact with the external ducts of greater thickness.

There is shown in FIGS. 5 and 5' another form of construction of the nuclear boiler in accordance with the invention.

In this alternative form, the supporting and coupling flange 400 has a greater thickness in order to form ducts in the thickness of the flange as will be explained hereinafter.

The nozzle openings 14 and 14' are extended by water-boxes 402 and 402' within the thickness of the flange 400. At the level of each water-box, the flange 400 forms surfaces 404 and 404' for connecting and supporting the pumps and heat exchangers.

The steam generator 406 is of the type in which provision is made for a tube-plate 408, a central chimney 410 for the introduction of the primary liquid and straight tubes 412 in which the primary liquid exchanges its heat with the secondary liquid which circulates within the steam generator enclosure 414. The generator is connected to a short duct 416 of substantial thickness and terminating in a flange 418 which is fixed on the junction surface 404. Provision is made within the duct 416 for a pipe which passes axially through said duct and is constituted by the tubes 420 and 422 which are joined together at the level of the surface 404. The tube 420 passes through the nozzle opening 14 in leak-tight manner and its free extremity is joined to the orifice 74 formed in the core barrel 18. The free extremity of the tube 422 is joined to the inlet of the chimney 410.

The pump 424 is fixed on the short, thick-walled and elbowed duct 426 and this latter terminates in a flange 428 which is fixed on the junction surface 404'. The duct 426 thus forms an extension of the water-box 402' and is fitted internally with an elbowed axial pipe 430. One end of said pipe is connected to the inlet of the pump 424 and the other end is connected to the inlet of a passageway 432 formed within the thickness of the flange 400. Said passageway establishes a communication between a water-box associated with a heat exchanger and a water-box associated with a pump.

A clearer understanding of this connection will be understood by reference to FIG. 5' in which the flange 400 is shown in horizontal cross-section along the line V—V. This figure shows the connection between the heat exchanger 406 and the adjacent pump 424'.

The "hot" liquid discharged from the reactor vessel penetrates into the heat exchanger 406 through the tube 420, is discharged through the duct 416, enters the water-box 402, follows the internal passageway 432' and then the pipe 430' which returns the liquid to the pump 424'. At the discharge end of the pump, said liquid passes through the water-box 402' and the nozzle opening 14' and finally flows into the annular space 26.

It should be understood that the difference between FIGS. 5 and 5' has arisen from considerations of clarity of the drawings. In fact, the pump 424 and the heat exchanger 406 are shown in FIG. 5 in a substantially diametral plane but there is no connection between said pump and said heat exchanger. On the contrary, FIG. 5' clearly shows that the heat exchanger 406 and the pump 424 are in fact connected to each other. So far as concerns the boiler as a whole, it is evident that provision is usually made for a number of "pump and heat exchanger" units. FIG. 5 also shows the circuits corresponding for example to the heat exchanger 406' and to the pump 424.

What we claim is:

1. A nuclear boiler, comprising a vertical pressure vessel which is provided with a closed bottom and a closure head at the top, a reactor core in the vessel, a heat exchanger through which liquid can be circulated to cool said reactor core, a pump for circulating said liquid located external of the pressure vessel and below the closure head, a flange located on the outer surface of the pressure vessel and in the upper portion thereof above the reactor core for providing a junction and a supporting surface therein to which the heat exchanger is connected, a nozzle in the flange for proving access to the interior of the pressure vessel, the heat exchanger further being located entirely above said nozzle and the input thereto being located below the closure head, first liquid conducting means for connecting the outlet of the reactor core with the inlet of the heat exchanger through said nozzle, second liquid conducting means for connecting the outlet of the heat exchanger with the inlet of the pump, and third liquid conducting means for connecting the outlet of the pump with the inlet of the reactor core.

2. A nuclear boiler according to claim 1, wherein the lower end of the heat exchanger is fixed on a water-box, the upper wall of the water-box including a tube plate which also forms the bottom of the heat exchanger for forming the inlet and outlet of the heat exchanger, said water-box being connected to said pressure vessel by means of a duct fixed on said supporting surface at the level of a nozzle opening and adapted to support the heat exchanger and pump, said duct and said nozzle being fitted with an axial pipe such that one pipe extremity has its opening in an orifice formed in a barrel which surrounds the reactor core and the second pipe extremity opens into said water-box, wherein the pump includes a pump body and rotor, the pump body being located outside the water-box and the rotor being located inside the water-box, and wherein said water-box is provided with internal baffle-plates for connecting the second pipe extremity to the heat-exchanger inlet so as to connect the outlet of said heat exchanger to the inlet of said pump and so as to connect the outlet of said pump to said pipe extremity which is connected to said water-box.

3. A nuclear boiler according to claim 2, wherein the pump associated with a heat exchanger is also vertical, wherein the pump is attached to the lower portion of said water-box, and wherein said pump is located substantially in the line of extension of said heat exchanger.

4. A nuclear boiler according to claim 3, wherein each water-box is provided internally with a first open-topped shell of revolution placed coaxially with the pump and forming an extension of an opening provided at the bottom of said water-box in order to permit the introduction of the pump rotor, a second open-topped shell completely surrounding the first shell in coaxial relation thereto, and a third shell displaced off-center with respect to the first two shells and including a domical portion for closing said third shell at the top, said third shell being partially joined to said second shell by means of said domical portion so that a free, bottom edge is formed along the portion not joined to the second shell, the space between the free bottom edge and the second shell forming a passageway between the interior of the second shell and the remainder of said water-box.

5. The boiler in claim 1, wherein a second flange is located on the outer surface of the pressure vessel and in the upper portion thereof and above the reactor core for providing a second junction and a supporting surface thereon to which the pump is connected, a nozzle in the flange for providing access to the interior of the pressure vessel, and the second liquid conducting means including means for connecting both the heat exchanger outlet and pump inlet with the interior of the pressure vessel.

6. A nuclear boiler according to claim 5, wherein the lower end of each heat exchanger is fixed on a water-box so as to constitute the inlet and outlet of said exchanger, said water-box being joined to a barrel which surrounds the reactor core by means of a duct fixed on said junction surface at the level of a nozzle opening and being extended within the interior of the pressure vessel by a sleeve providing a connection with said barrel, said duct and said sleeve being fitted with an axial pipe such that one pipe extremity has its opening in an inner shell located inside said barrel and the second pipe extremity opens into the water-box, said water-box being fitted with baffle-plates for connecting said second pipe extremity to the inlet of said heat exchanger, and wherein the lower portion of each pump is fixed on a water-box so as to constitute both the inlet and the outlet of said pump, said water-box being connected to said pressure vessel by means of a duct fixed on said junction surface at the level of a nozzle opening, said duct and said nozzle being fitted with an axial pipe such that one pipe extremity has its opening in an orifice formed in a barrel which surrounds the reactor core and the second pipe extremity opens into said water-box.

7. A nuclear boiler according to claim 5, wherein said pressure-vessel flange has a sufficient thickness to provide within said flange a water-box which forms an extension of each nozzle and each junction surface surrounds each water-box, wherein said pressure vessel is provided internally with a cylindrical shell which surrounds the reactor core and forms between said shell and said vessel an annular space into which said nozzles open, the lower portion constituting the inlet and outlet of each heat exchanger being fixed on a duct connected to a junction surface at the level of a water-box, said duct and said water-box being traversed axially by a pipe such that one pipe extremity is connected to the inlet of said heat exchanger and the other pipe extremity is connected to the core barrel at the level of a nozzle opening formed in said barrel, said pipe being intended to close-off the opening which is associated with said water-box, and wherein the lower portion constituting the inlet and outlet of each pump is fixed on a duct connected to a junction surface at the level of a water-box, a water-box associated with a heat exchanger being connected to a water-box associated with a pump by means of a passageway formed within the thickness of the vessel flange, the inlet of a pump being connected to one of said passageways by means of a pipe extending axially through said duct which is associated with said pump.

* * * * *